(12) United States Patent
Humer et al.

(10) Patent No.: US 8,162,392 B2
(45) Date of Patent: Apr. 24, 2012

(54) VEHICLE SEAT HAVING ACTIVE HEAD RESTRAINT SYSTEM

(75) Inventors: Mladen Humer, Eastpointe, MI (US); Nagarjun Yetukuri, Rochester Hills, MI (US); Gerald Locke, Lake Orion, MI (US); Dale Smallwood, Clarkston, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 12/257,542

(22) Filed: Oct. 24, 2008

(65) Prior Publication Data

US 2009/0045658 A1 Feb. 19, 2009

Related U.S. Application Data

(63) Continuation of application No. 10/950,713, filed on Sep. 27, 2004, now Pat. No. 7,644,987.

(51) Int. Cl.
*B60N 2/42* (2006.01)

(52) U.S. Cl. ............................ 297/216.12; 297/216.13

(58) Field of Classification Search ............. 297/216.12, 297/216.13, 216.14
See application file for complete search history.

(56) References Cited

U.S. PATENT DOCUMENTS

| | | | |
|---|---|---|---|
| 2,636,552 A | 4/1953 | Long | |
| 3,506,306 A | 4/1970 | Herzer et al. | |
| 3,547,486 A | 12/1970 | Herzer et al. | |
| 3,572,834 A | 3/1971 | Herzer et al. | |
| 3,652,128 A | 3/1972 | Schwarz | |
| 3,655,241 A | 4/1972 | Herzer et al. | |
| 3,692,356 A | 9/1972 | Mertens | |
| 3,695,699 A | 10/1972 | Mertens | |
| 3,706,472 A | 12/1972 | Mertens | |
| 3,802,737 A | 4/1974 | Mertens | 297/216 |
| 5,378,043 A | 1/1995 | Viano et al. | 297/408 |
| 5,651,582 A | 7/1997 | Nakano | 297/216.13 |
| 5,673,972 A | 10/1997 | Dudash et al. | 297/378.12 |
| 5,722,722 A | 3/1998 | Massara | 297/216.13 |
| 5,772,280 A | 6/1998 | Massara | 297/216.12 |
| 5,779,263 A | 7/1998 | Lane, Jr. et al. | 280/730.2 |
| 5,795,019 A | 8/1998 | Wieclawski | 297/216.12 |
| 5,868,466 A | 2/1999 | Massara et al. | 297/284.6 |
| 5,884,968 A | 3/1999 | Massara | 297/216.12 |

(Continued)

FOREIGN PATENT DOCUMENTS

DE 1555868 7/1969

(Continued)

OTHER PUBLICATIONS

Complaint for Patent Infringement and Jury Demand, *Lear Corporation v. TS Tech USA Corporation et al.*, Case No. 2:07-cv-406 TJW.

(Continued)

*Primary Examiner* — Anthony D Barfield
(74) *Attorney, Agent, or Firm* — Bliss McGlynn, P.C.

(57) ABSTRACT

A vehicle seat assembly having a seatback frame, an upper armature that is movable relative to the seatback frame and a head restraint mounted on the upper armature. A linkage assembly operatively interconnects the upper armature and an impact body such that movement of the impact body relative to the seatback frame acts on the linkage assembly to move the upper armature relative to the seatback frame to cause the head restraint to move toward the occupant. The linkage assembly includes a linkage and a coupler movably connected to the linkage. The coupler includes a first member movably connected to the seatback frame and a second member movably connected to the first member at a location below the upper end of the impact body.

26 Claims, 4 Drawing Sheets

U.S. PATENT DOCUMENTS

| | | | | |
|---|---|---|---|---|
| 5,938,279 | A | 8/1999 | Schubring et al. | 297/216.12 |
| 6,019,424 | A | 2/2000 | Rueckert et al. | 297/216.12 |
| 6,024,406 | A | 2/2000 | Charras et al. | 297/216.12 |
| 6,036,266 | A | 3/2000 | Massara | 297/328 |
| 6,199,947 | B1 | 3/2001 | Wiklund | 297/216.12 |
| 6,213,549 | B1 | 4/2001 | Wieclawski | 297/216.13 |
| 6,340,206 | B1 | 1/2002 | Andersson et al. | 297/216.14 |
| 6,375,262 | B1 | 4/2002 | Watanabe | 297/284.4 |
| 6,398,299 | B1 | 6/2002 | Angerer et al. | 297/216.12 |
| 6,416,125 | B1 | 7/2002 | Shah et al. | 297/216.12 |
| 6,416,127 | B1 | 7/2002 | Galbreath, Jr. et al. | 297/216.13 |
| 6,523,892 | B1 | 2/2003 | Kage et al. | 297/216.13 |
| 6,565,150 | B2 | 5/2003 | Fischer et al. | 297/216.12 |
| 6,604,788 | B1 | 8/2003 | Humer | 297/216.13 |
| 6,631,949 | B2 | 10/2003 | Humer et al. | 297/216.12 |
| 6,631,955 | B2 | 10/2003 | Humer et al. | 297/408 |
| 6,655,733 | B2 | 12/2003 | Humer et al. | 297/216.12 |
| 6,719,368 | B1 | 4/2004 | Neale | 297/216.14 |
| 6,749,256 | B1 | 6/2004 | Klier et al. | 297/216.12 |
| 6,767,064 | B2 | 7/2004 | Veine et al. | 297/391 |
| 6,779,840 | B1 | 8/2004 | Farquhar et al. | 297/216.12 |
| 6,789,845 | B2 | 9/2004 | Farquhar et al. | 297/216.12 |
| 6,789,846 | B2 | 9/2004 | Humer et al. | 297/216.12 |
| 6,837,541 | B2 | 1/2005 | Farquhar et al. | 297/216.13 |
| 6,866,339 | B2 | 3/2005 | Itoh | 297/216.13 |
| 6,871,913 | B2 | 3/2005 | Malsch et al. | 871/410 |
| 6,890,029 | B2 | 5/2005 | Svantesson | 297/216.12 |
| 6,955,397 | B1 | 10/2005 | Humer | 297/216.12 |
| 6,957,858 | B2 | 10/2005 | Yetukuri et al. | 297/216.12 |
| 6,991,288 | B2 | 1/2006 | Farquhar et al. | 297/216.14 |
| 7,044,544 | B2 | 5/2006 | Humer et al. | 297/216.12 |
| 7,104,602 | B2 | 9/2006 | Humer et al. | 297/216.12 |
| 7,731,280 | B2 | 6/2010 | Niitsuma et al. | |
| 2006/0103189 | A1 | 5/2006 | Humer et al. | 297/216.13 |
| 2008/0129092 | A1 | 6/2008 | Omori | |
| 2008/0265637 | A1 | 10/2008 | Niitsuma | 297/216.12 |
| 2009/0309398 | A1 | 12/2009 | Niitsuma et al. | |
| 2010/0001562 | A1 | 1/2010 | Sayama | |
| 2010/0007183 | A1 | 1/2010 | Akutsu | |
| 2010/0026060 | A1 | 2/2010 | Niitsuma et al. | |
| 2010/0060047 | A1 | 3/2010 | Furuta et al. | |
| 2010/0066145 | A1 | 3/2010 | Akutsu | |
| 2010/0102607 | A1 | 4/2010 | Mizoi | |
| 2010/0148545 | A1 | 6/2010 | Omori | |
| 2010/0164270 | A1 | 7/2010 | Akutsu | |
| 2010/0176630 | A1 | 7/2010 | Nitsuma | |
| 2010/0181810 | A1 | 7/2010 | Yasuda et al. | |

FOREIGN PATENT DOCUMENTS

| | | | |
|---|---|---|---|
| DE | 1680100 | | 8/1970 |
| DE | 1922086 | | 2/1971 |
| DE | 1944289 | | 3/1971 |
| DE | 1944411 | | 3/1971 |
| DE | 1944414 | | 3/1971 |
| DE | 1945768 | | 3/1971 |
| DE | 1944293 | | 4/1971 |
| DE | 1780322 | | 5/1971 |
| DE | 1944290 | | 6/1971 |
| DE | 1944412 | | 6/1971 |
| DE | 2100676 | | 9/1972 |
| DE | 2152202 | A1 | 4/1973 |
| DE | 2152437 | A1 | 4/1973 |
| DE | 2337521 | A1 | 2/1975 |
| DE | 2339357 | A1 | 2/1975 |
| DE | 1944413 | C3 | 7/1978 |
| DE | 3900495 | A1 | 7/1990 |
| DE | 3925995 | A1 | 2/1991 |
| DE | 694 06 189 | T2 | 2/1998 |
| DE | 19752247 | A1 | 6/1999 |
| DE | 198 50 758 | A1 | 5/2000 |
| DE | 199 10 666 | A1 | 9/2000 |
| DE | 10060764 | C1 | 1/2002 |
| DE | 102 12 828 | C1 | 6/2003 |
| DE | 102 28 675 | C1 | 8/2003 |
| DE | 102 49 265 | B3 | 2/2004 |
| EP | 0 627 340 | A1 | 12/1994 |
| EP | 1053907 | A1 | 11/2000 |
| EP | 1908628 | A1 | 7/2006 |
| EP | 1864852 | B1 | 5/2010 |
| FR | 1572770 | | 6/1969 |
| FR | 2016705 | | 5/1970 |
| FR | 2060344 | | 6/1971 |
| FR | 2060684 | | 6/1971 |
| FR | 2063150 | | 9/1971 |
| FR | 2068836 | | 9/1971 |
| FR | 2590529 | A1 | 5/1987 |
| FR | 2602133 | A1 | 2/1988 |
| FR | 2844489 | A | 3/2004 |
| FR | 2846921 | A | 5/2004 |
| GB | 1201897 | | 8/1970 |
| GB | 1208656 | | 10/1970 |
| GB | 1215263 | | 12/1970 |
| GB | 1245544 | | 9/1971 |
| GB | 1245901 | | 9/1971 |
| GB | 1268611 | | 3/1972 |
| GB | 1273512 | | 5/1972 |
| GB | 1322280 | A | 7/1973 |
| GB | 1 391 644 | | 4/1975 |
| GB | 2161702 | A | 1/1986 |
| JP | S49-25690 | | 7/1974 |
| JP | 10006832 | A | 1/1998 |
| JP | 10-138811 | | 5/1998 |
| JP | H10-138814 | | 5/1998 |
| JP | 10-262776 | | 10/1998 |
| JP | 2000-1138 | A | 2/2000 |
| JP | 2002-274240 | | 9/2002 |
| JP | 2002345596 | A | 12/2002 |
| JP | 3673480 | | 4/2005 |
| NL | 9000859 | A | 11/1991 |
| WO | WO87/03256 | | 4/1987 |
| WO | WO 01/64475 | A1 | 9/2001 |
| WO | WO 2006/070650 | A1 | 7/2006 |
| WO | 2006085658 | A1 | 8/2006 |
| WO | 2007007850 | A1 | 1/2007 |
| WO | 2007138730 | A1 | 6/2007 |
| WO | 2007145359 | A1 | 12/2007 |
| WO | 2009011389 | A1 | 1/2009 |
| WO | 2009066729 | A1 | 5/2009 |
| WO | 2009066730 | A1 | 5/2009 |

OTHER PUBLICATIONS

Aug. 31, 2005 "Office Action" for U.S. Appl. No. 10/950,709.
Sep. 27, 2005 "Amendment" for U.S. Appl. No. 10/950,709.
Nov. 1, 2005 "Final Office Action" for U.S. Appl. No. 10/950,709.
Nov. 21, 2005 "Amendment After Final Rejection Pursuant to 37 CFR 1.116" for U.S. Appl. No. 10/950,709.
Dec. 12, 2005 "Notice of Allowance and Fee(s) Due" for U.S. Appl. No. 10/950,709.
Mar. 21, 2005 "Office Action" for U.S. Appl. No. 10/950,711.
Apr. 11, 2005 "Amendment" for U.S. Appl. No. 10/950,711.
Apr. 28, 2005 "Notice of Allowance and Fee(s) Due" for U.S. Appl. No. 10/950,711.
Aug. 1, 2011 Request for Ex Parte Reexamination of U.S. Patent No. 7,644,987 (Re-Exam Control Number 90/011,818).
Feb. 17, 2012 Request for Ex Parte Reexamination of U.S. Patent No. 7,644,987 Pursuant to 35 U.S.C. 302, 37 C.F.R. 1.510.

VEHICLE SEAT HAVING ACTIVE HEAD RESTRAINT SYSTEM

CROSS-REFERENCE TO RELATED APPLICATIONS

This application is a continuation of U.S. Ser. No. 10/950,713, entitled "Vehicle Seat Having Active Head Restraint System" filed Sep. 27, 2004 now U.S. Pat. No. 7,644,987.

BACKGROUND OF THE INVENTION

1. Field of the Invention

The present invention relates, generally, to a vehicle seat, and more specifically to a vehicle seat having an active head restraint system.

2. Description of the Related Art

Conventional vehicle seat designs of the type commonly found in the related art typically include a seatback assembly, a lower seat assembly, recliner mechanism, manual or power adjustment mechanism for adjusting a number of positions of either the seatback or lower seat assemblies, as well as a number of safety features including occupant restraint devices such as seatbelts. The seatback assembly also includes a headrest or head restraint that is typically mounted at the top or upper end of the seatback.

In the context of vehicle seating design, there is an ongoing effort to improve the safety of the vehicle occupant in the event of a rear end collision. More specifically, there continues to be an ongoing effort to provide safety mechanisms that reduce the chance of injury in the region of the passengers' neck. In the event of a rear end collision, the occupant is forced against the seat and can experience a large energy pulse. In such circumstances, the pelvis, lumbar, and shoulder or thoracic areas of the occupant can exert force on the seatback, and there is often a separation between the neck and head areas of the occupant and the head restraint. Depending on the force of the rear end collision, this separation can be quickly and violently closed by movement of the upper torso, neck, and head of the passenger toward the seatback in an event commonly known as "whiplash." Thus, there has been an ongoing effort to address this problem in the context of vehicle seating safety.

In the past, the head restraint was a relatively static device that was typically moveable up and down or slightly tiltable, but usually in connection with adjustments made for the comfort of any given occupant of the seat during normal driving conditions. However, in order to address the problems encountered during a rear end collision, dynamic or active head restraint mechanisms have been proposed in the related art.

For example, U.S. Pat. No. 5,938,279 issued to Schubring et al. and assigned to the assignee of the present invention discloses a dynamic vehicle head restraint assembly that is designed to reduce the amount of separation between the occupant and the head restraint in the event of a rear end collision. The head restraint assembly includes an impact or target plate that is supported by the seatback frame in the general area corresponding to the thoracic or shoulder region of the occupant. The impact plate is pivotally mounted to a linkage that is connected to the head restraint. In the event of a rear end collision, the force of the occupant on the target plate actuates the linkage to cause the head restraint to move toward the head of the occupant, thereby reducing the amount of separation between the occupant and the seatback.

While the dynamic head restraint systems of the type known in the related art were an improvement over the previously known static head restraints, there remains a need in the art to better absorb and dissipate the energy generated by the force acting on the seatback in the event of a rear end collision, especially at the pelvic and lumbar areas, which are generally remote from the head restraint.

U.S. Pat. No. 6,565,150, assigned to the assignee of the present invention, discloses a vehicle seat having an active head restraint that is designed to address this problem. More specifically, the seat has a pivotal support assembly that is mounted to the seatback frame and is operatively connected to the head restraint such that the head restraint moves toward the occupant in the event of a rear end collision. The pivotal support assembly includes a lower impact target that is located in the pelvic and lumbar regions to dissipate the forces that are first translated to the seatback in this area. The lower target is operatively connected to a reaction plate that is pivotally mounted to the seatback. In turn, the head restraint is mounted to the reaction plate.

While the dynamic head restraint systems known in the related art have generally worked for their intended purposes and have improved safety, there remains a need in the art for a vehicle seat assembly that more efficiently and more quickly transfers forces from the occupant to the head restraint system for more effective actuation of the head restraint toward the occupant during a collision. There also remains a need in the art for a vehicle seat assembly with an active head restraint system that is less expensive, lighter, and easier to assemble.

SUMMARY OF THE INVENTION

In one embodiment, a vehicle seat assembly is provided with a seatback frame and an active head restraint system operatively supported by the seatback frame. The active head restraint system includes an upper armature movably mounted to the seatback frame, a head restraint mounted to the upper armature, and a lower armature operatively attached to the upper armature. The lower armature is operable to move toward the upper armature in response to a predetermined force applied to the lower armature and act on the upper armature to move the head restraint toward the occupant.

In another embodiment, a vehicle seat assembly is provided with a seatback frame, an upper armature is moveable relative to the seatback frame, and a head restraint mounted on the upper armature. An impact body is movable relative to the seatback frame and the impact body includes an upper end. A linkage assembly operatively interconnects the upper armature and the impact body such that movement of the impact body relative to the seatback frame acts on the linkage assembly to move the upper armature relative to the seatback frame to cause the head restraint to move toward the occupant. The linkage assembly includes a linkage and a coupler movably connected to the linkage. The coupler includes a first member movably connected to the seatback frame and a second member movably connected to the first member at a location below the upper end of the impact body.

In yet another embodiment, a vehicle seat assembly is provided for receiving an occupant. The seat assembly includes a seatback frame and an active head restraint system operatively supported by the seatback frame. The active head restraint system includes an upper armature movably mounted to the seatback frame, a head restraint mounted to the upper armature and a lower armature movably supported relative to the seatback frame. A coupler extends between the lower armature and the upper armature and operatively interconnects the upper armature and the lower armature such that movement of the lower armature relative to the seatback acts on the coupler to move the upper armature relative to the seatback so as to move the head restraint toward the occupant.

In yet another embodiment, a vehicle seat assembly is provided for receiving an occupant. The seat assembly includes a seatback frame, an upper armature that is movable relative to the seatback frame, and a head restraint mounted on the upper armature. An impact body is movable relative to the seatback frame. A linkage assembly is operatively associated with the upper armature and the impact body such that movement of the impact body relative to the seatback frame acts on the linkage assembly to move the upper armature relative to the seatback frame to thereby cause the head restraint to move upward and forward toward the occupant. The linkage assembly includes a linkage movably connected to the seatback frame, a first coupler member movably connected to the linkage, and a second coupler movably connected to the first coupler member and movably connected to the seatback frame.

BRIEF DESCRIPTION OF THE DRAWINGS

Other advantages of the invention will be readily appreciated as the same becomes better understood by reference to the following detailed description when considered in connection with the accompanying drawings, wherein.

DETAILED DESCRIPTION

Figure 1:
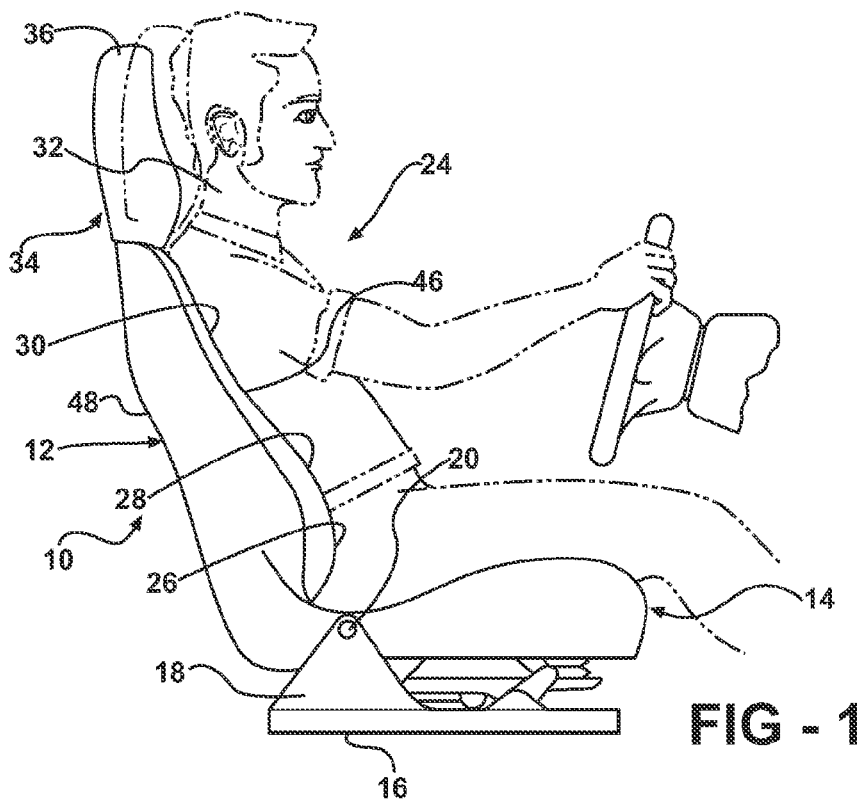
FIG. 1 is an elevational side view of a vehicle seat assembly of the present invention illustrated in relation to a schematically shown occupant of the vehicle seat assembly.

Referring now to the drawings, where like numerals are used to designate like structure throughout the Figures, a vehicle seat assembly of the present invention is generally indicated at 10 in FIG. 1. The vehicle seat assembly 10 includes a seatback, generally indicated at 12, and a lower seat assembly, generally indicated at 14, that is supported on a seat track mechanism 16, as is commonly known in the art. The seatback 12 may be pivotally connected to the lower seat assembly 14 by means of a bracket 18 via pivot point 20 that forms a part of the seat track mechanism 16. In this way, the vehicle seat assembly 10 may be adapted to recline or adjust in a number of ways that are commonly known in the art. In addition to these common elements, the seat assembly 10 of the present invention may include various controls and restraint systems, such as seatbelts, etc. that are not shown, but that are well known in the art.

An occupant, generally indicated at 24, is shown in phantom seated upon the vehicle seat assembly 10. The occupant 24 has a pelvic area 26, which is proximate to both the lower seat assembly 14 and to the lower end of the seatback 12. The occupant 24 also has a lumbar area 28 supported above the pelvic area 26, and a shoulder or thoracic area 30 supported above the lumbar area 28. Furthermore, the occupant 24 has a head and neck area 32 supported above the thoracic area 30.

The vehicle seat assembly 10 also includes an active head restraint system, generally indicated at 34, operatively supported by the seatback 12. The active head restraint system 34 includes a head restraint 36 proximate to the head and neck area 32 of the occupant 24. The head restraint 36 can be positioned in an upright position (shown in solid in FIG. 1) and can be positioned in an operative position (shown in phantom in FIG. 1), wherein the head restraint 36 is pivoted forward and upward, toward the head and neck area 32 of the occupant 24. In the event of a rear end collision, the forces that are generated can cause the occupant 24 to be driven generally rearward toward the seatback 12. As will be described in greater detail below, forces from the occupant 24 on the seatback 12 are transferred through the active head restraint system 34 to ultimately move the head restraint 36 from the upright position to the operative position toward the head and neck area 32 of the occupant 24. This movement of the head restraint 36 better supports the head and neck area 32 of the occupant 24 during the rear end collision, reducing the likelihood of a whiplash injury.

Referring to FIGS. 2 through 5, the seatback 12 of the vehicle seat assembly 10 is shown in more detail. The vehicle seat assembly 10 includes a seatback frame, generally indicated at 38. The seatback frame 38 includes a pair of side frame members 40 that are disposed in a generally vertical orientation and are spaced horizontally relative to one another. The seatback frame 38 also includes upper and lower cross members 42, 44, respectively, that extend horizontally between the pair of side frame members 40. As such, the seatback frame 38 defines a forward side 46 and a rearward side 48 of the seatback 12. The seatback frame 38 may have a "unibody" construction wherein the side frame members 40 as well as the upper and lower cross member 42, 44 are integrally formed. In addition, the seatback frame 38 may be assembled from separate components making up the side frame members 40 and upper and lower cross members 42, 44 that are then welded or otherwise permanently fixed to each other. Thus, and from the description that follows, those having ordinary skill in the art will appreciate that a number of different means of operatively interconnecting the components of the seatback frame 38 may be employed without departing from the scope of the present invention.

As shown in FIGS. 2 through 5, the active head restraint system 34 generally includes an upper armature, generally indicated at 50, and a lower armature, generally indicated at 52. The upper armature 50 is moveably mounted to the seatback frame 38 so as to be disposed proximate the upper cross member 42 of the seatback frame 38. The head restraint 36 is mounted to the upper armature 50 so as to be disposed proximate to the head and neck area 32 of the occupant 24. Also, the lower armature 52 is disposed below and is operatively attached to the upper armature 50 so as to be disposed proximate to the pelvic, lumbar, and thoracic areas 26, 28, 30 of the occupant 24. As will be described in greater detail below, the lower armature 52 is operable to move toward and act upon the upper armature 50 in response to a predetermined force applied to the lower armature 52 to move the head restraint 36 toward the occupant 24. The lower armature 52 is also operable to move toward the rearward side 48 of the seatback 12 in response to a predetermined force applied to the lower armature 52 and act upon the upper armature 50 to move the head restraint 36 toward the occupant 24.

Figure 2:
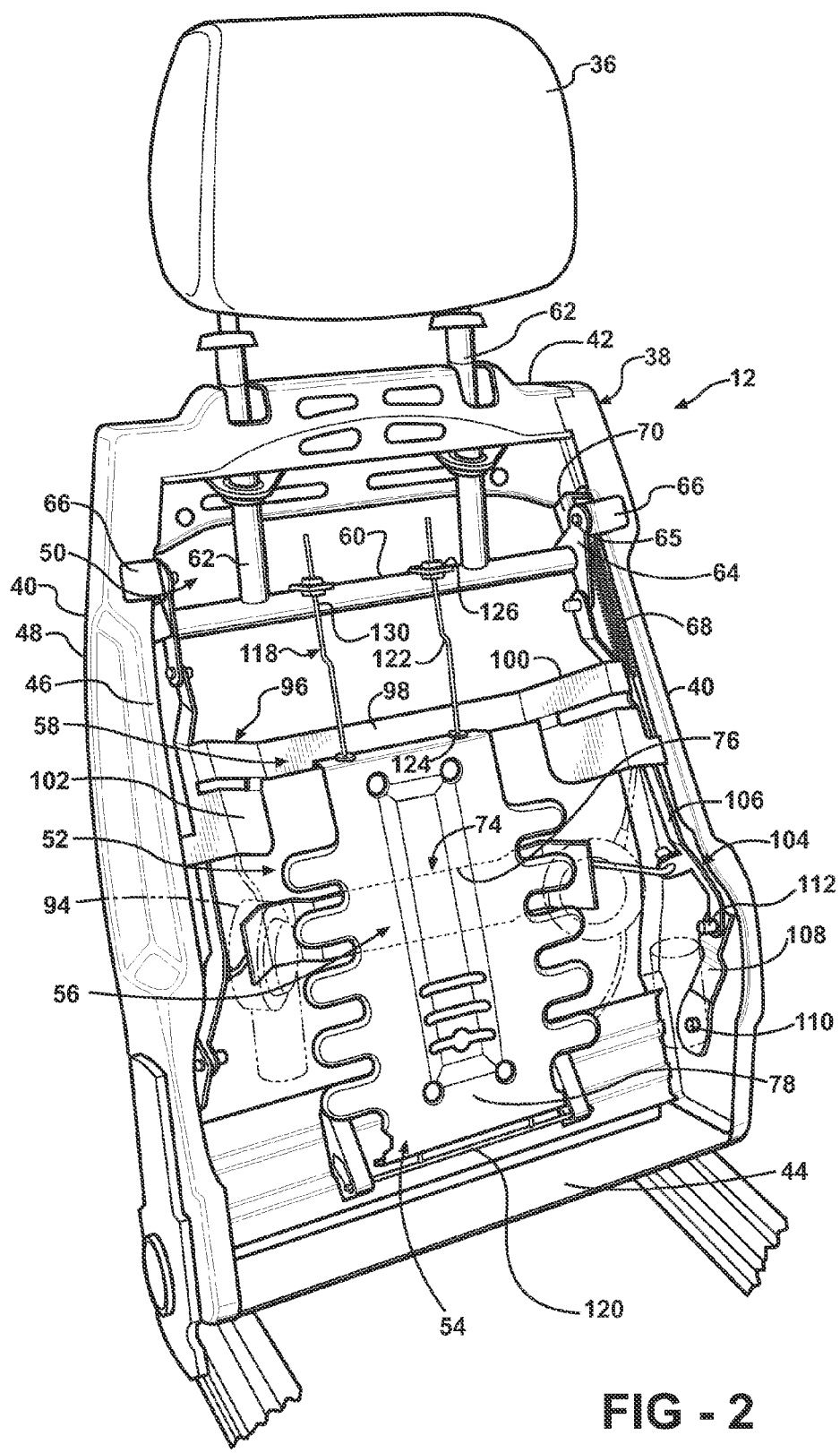
FIG. 2 is a front perspective view of one embodiment of the vehicle seat assembly of the present invention with an active head restraint system.

As shown in FIG. 2, the lower armature 52 includes a pelvic support mechanism 54 disposed proximate to the pelvic area 26 of the occupant 24, a lumbar support mechanism 56 disposed proximate to the lumbar area 28 of the occupant 24, and a thoracic support mechanism 58 disposed proximate to the thoracic area 30 of the occupant 24. In the event of a rear end collision, the occupant 24 will exert forces on the lower armature 52. If these forces exceed a predetermined level, the lower armature 52 transfers the forces to pivot the upper armature 50, thereby moving the head restraint 36 toward the head and neck area 32 of the occupant 24. Specifically, forces from the pelvic area 26 of the occupant 24 transfer to the pelvic support mechanism 54, forces from the lumbar area 28 of the occupant 24 transfer to the lumbar support mechanism 56, and forces from the thoracic area 30 of the occupant 24 transfer to the thoracic support mechanism 58. As will be described in greater detail below, the pelvic, lumbar, and thoracic support mechanisms 54, 56, 58 cooperatively transfer the forces to pivot the upper armature 50, thereby moving the head restraint 36 toward the head and neck area 32 of the occupant 24. As such, the head and neck area 32 of the occupant 24 is better supported during a rear end collision.

Figure 3:
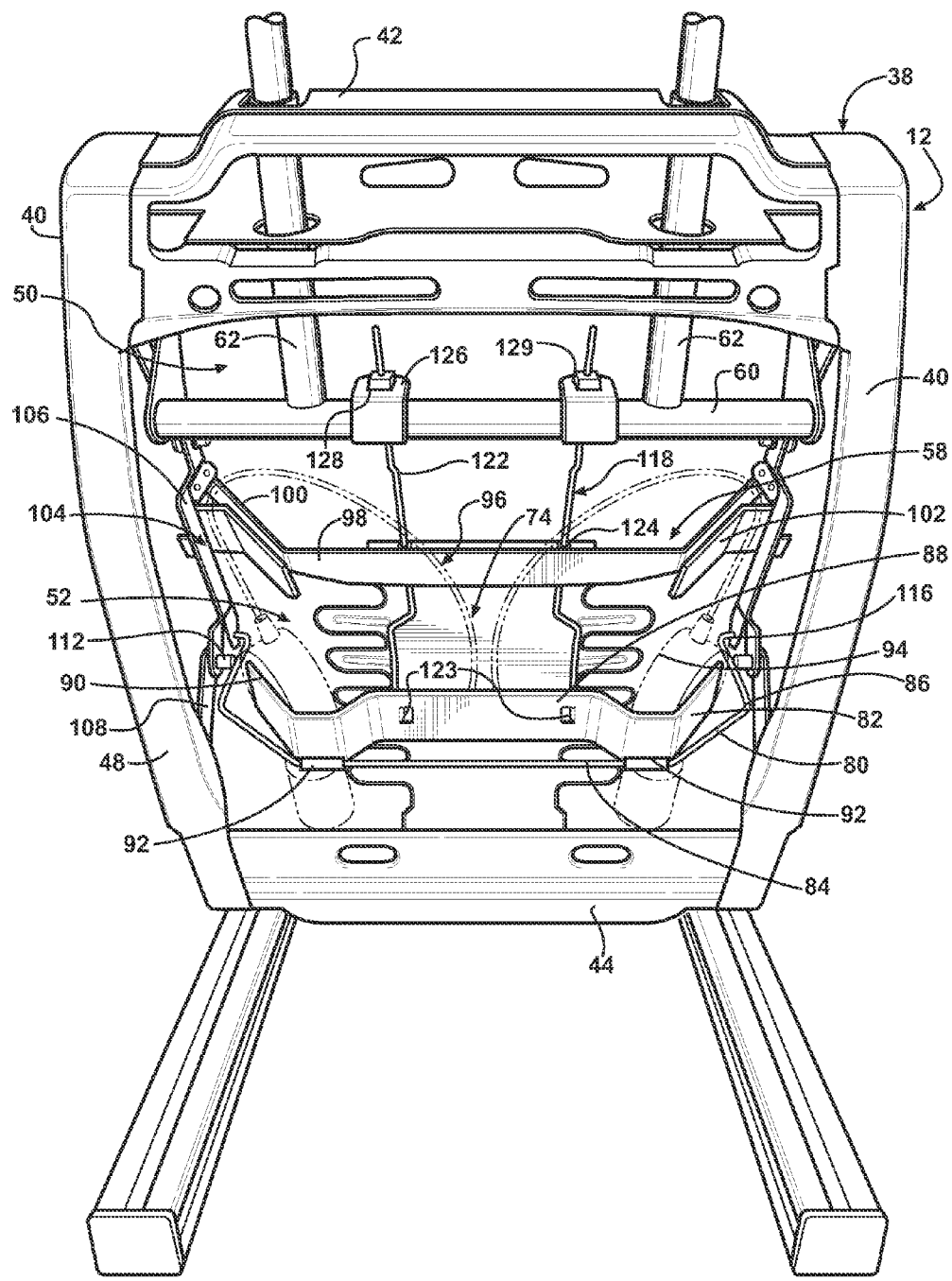
FIG. 3 is a rear perspective view of the vehicle seat assembly shown in FIG. 2.
Figure 4:
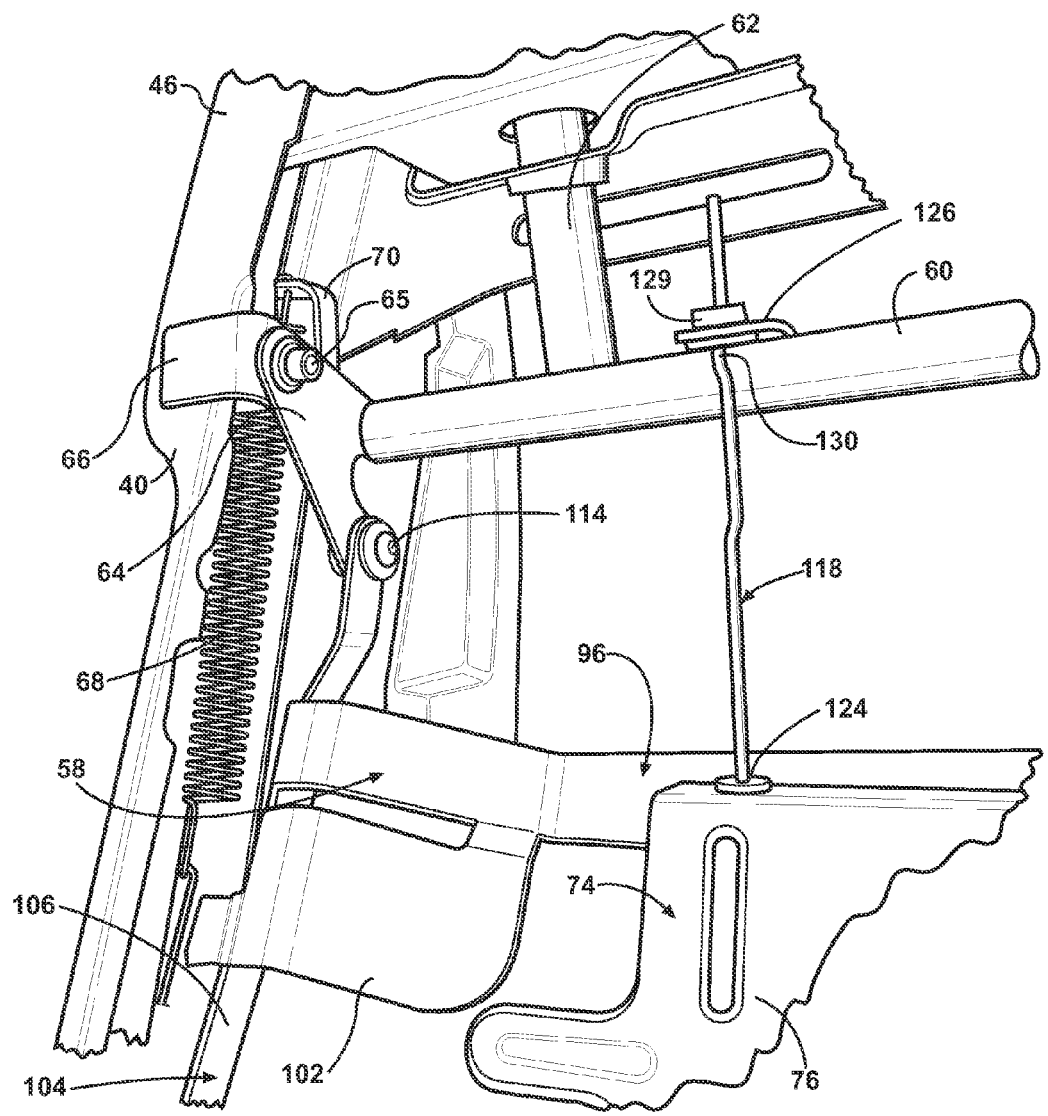
FIG. 4 is a side perspective view of the upper end of the vehicle seat assembly shown in FIG. 2.

One embodiment of the upper armature 50 is illustrated in FIGS. 2 through 4. The upper armature 50 includes a cross bar 60 and a plurality of posts 62. The cross bar 60 is disposed horizontally, and the posts 62 are spaced on the cross bar 60 and extend vertically therefrom. The head restraint 36 is mounted to an upper end of each post 62 such that movement of the cross bar 60 coincidentally moves the posts 62 and head restraint 36. The head restraint 36 can be rigidly mounted to the upper end of the posts 62 or the head restraint 36 could be moveably mounted to the posts 62 in a known manner to allow the head restraint to be tilted, raised, and/or lowered relative to the posts 62 without departing from the scope of the invention.

The upper armature 50 also includes at least one, and preferably, a plurality of linkages 64 shown in FIGS. 2 and 4. In the embodiment shown, there are linkages 64 rigidly mounted to opposite ends of the cross bar 60. The linkages 64 can be rigidly mounted to the cross bar 60 in any suitable manner, such as welds, fasteners, or the like. Each linkage 64 is also pivotally mounted to the seatback frame 38 at pivot point 65. For instance, in the embodiment shown, the seatback frame 38 includes a plurality of L-shaped brackets 66, each rigidly mounted to one of the side frame members 40, and each linkage 64 is pivotally connected to one of the L-shaped brackets 66. The linkages 64 can be attached to the L-shaped brackets 66 by fasteners, bearings, or the like. Each of the linkages 64 is also attached to the lower armature 52 in a manner to be described, and this attachment allows forces from the lower armature 52 to transfer to the upper armature 50, thereby moving the head restraint 36 toward the head and neck area 32 of the occupant 24.

The vehicle seat assembly 10 further includes at least one, and preferably, a plurality of biasing members 68 (FIGS. 2 and 4). Each biasing member 68 is operatively mounted to one of the linkages 64 and the seatback frame 38. The biasing member 68 is a coiled extension spring in the embodiment shown, but the biasing member 68 could be any other suitable member, such as a torsion spring, without departing from the scope of the invention. In the embodiment shown, each linkage 64 includes an L-shaped bracket 70. One end of each biasing member 68 is mounted to the bracket 70 through the aperture 72. The opposite end of each biasing member 68 is mounted to the side frame member 40. The biasing members 68 bias the upper armature 50 toward the upright position. Thus, the biasing members 68 provide resistance for the upper armature 50 from pivoting relative to the seatback frame 38. As will be described in greater detail below, when the lower armature 52 causes the head restraint 36 to move from the upright position to the operative position toward the head and neck area 32 of the occupant 24, the biasing members 68 return the head restraint 36 back to the upright position.

Referring specifically to FIGS. 2 and 3, one embodiment of the lower armature 52 is shown. The lower armature 52 includes an impact body, generally indicated at 74. The impact body 74 is generally planar, but can be of any suitable shape without departing from the scope of the invention. The impact body 74 is disposed toward the forward side 46 of the seatback 12 and is oriented generally vertical. The impact body 74 can be made out of any suitable material, and in one preferred embodiment, the impact body 74 is made out of a flexible material such that the impact body 74 is comfortable for the occupant 24 to sit against. In the embodiment shown, the impact body 74 includes an upper end 76 disposed proximate to the lumbar area 28 and a lower end 78 disposed proximate to the pelvic area 26 of the occupant 24. The impact body 74 is moveable in relation to the seatback frame 38. As will be described in greater detail below, force from the occupant 24 generated during a rear end collision is transferred to the upper armature 50 via the impact body 74.

As stated above, the lower armature 52 includes a lumbar support mechanism 56 that acts to transfer force from the lumbar area 28 of the occupant 24 to the upper armature 50. In the embodiment shown, the lumbar support mechanism 56 includes a linkage 80, shown in FIG. 3. The linkage 80 is operatively mounted to the impact body 74 such that force from the occupant 24 transfers into the linkage 80. To this end, the lumbar support mechanism 56 further includes a mounting bracket, generally indicated at 82 in FIG. 3. The mounting bracket 82 is operatively mounted to the impact body 74, and the linkage 80 is operatively mounted to the mounting bracket 82. More specifically, the linkage 80 is a bent, rigid rod that is disposed behind the impact body 74. The mounting bracket 82 is a bent, elongate sheet that is disposed between the linkage 80 and the impact body 74. The linkage 80 defines a middle section 84, which is straight and extends generally perpendicular to each of the side frame members 40, and two end sections 86, each of which extend from the middle section 84 toward the forward side 46 of the vehicle seat assembly 10. The mounting bracket 82 defines a middle section 88, which is straight and extends generally perpendicular to each of the side frame members 40, and two end sections 90, each of which are generally U-shaped. The mounting bracket 82 also includes a plurality of attachment members 92, each of which extend from the respective end section 90 and wrap around the middle section 84 of the linkage 80 as shown in FIG. 3. Preferably, the attachment members 92 pivotally mount the linkage 80 to the mounting bracket 82. Furthermore, the mounting bracket 82 is operatively mounted to the impact body 74 in a manner to be described such that forces from the occupant 24 transfer through the impact body 74, through the mounting bracket 82, through the linkage 80, and to the upper armature 50, thereby moving the head restraint 36 toward the head and neck area 32 of the occupant 24.

In one embodiment, the mounting bracket 82 can also be used for mounting other components within the vehicle seat assembly 10. In the embodiment shown, the vehicle seat assembly 10 includes a plurality of motors 94 (shown in phantom) that are mounted to the mounting bracket 82. The motors 94 are operable to adjust the height and curvature of the impact body 74 for increased comfort of the vehicle seat assembly 10. Those having ordinary skill in the art will appreciate, however, that the impact body 74 could be nonadjustable suspension system without departing from the scope of the invention.

Also, as mentioned above, the lower armature 52 includes a thoracic support mechanism 58 for transferring force from the thoracic area 30 of the occupant 24 to the upper armature 50. In the embodiment shown in FIGS. 2, 3, and 4, the thoracic support mechanism 58 includes a crossbar, generally indicated at 96. The crossbar 96 extends horizontally between the side frame members 40, and the crossbar 96 defines a middle section 98 and two end sections 100. The middle section 98 of the crossbar 96 is disposed proximate to the rearward side 48 of the seatback 12, and the end sections 100 extend from the middle section 98 toward the forward side 46 of the vehicle seat assembly 10 proximate to the side frame members 40. The crossbar 96 can be made from an elongate plate.

In the embodiment shown, the thoracic support mechanism 58 also includes at least one, and preferably, a plurality of enlarged portions 102. Each of the enlarged portions 102 are generally flat and rectangular and are mounted on one of the end sections 100 of the crossbar 96 by welding or other suitable method. Forces from the occupant 24, especially from the thoracic area 30 of the occupant 24, transfer to the crossbar 96 and to the upper armature 50 in a manner to be described in greater detail below. The enlarged portions 102 have an increased surface area so as to provide a larger impact area, especially near the shoulders of the occupant 24.

The lower armature 52 also includes at least one, and preferably, a plurality of couplers, generally indicated at 104 in FIGS. 2, 3, and 4. Each of the couplers 104 is operatively mounted to the upper armature 50. At least one of the couplers 104 interconnects the lumbar support mechanism 56 and the upper armature 50 so as to transfer force from the lumbar support mechanism 56 to the upper armature 50. Likewise, at least one of the couplers 104 interconnects the thoracic support mechanism 58 and the upper armature 50 so as to transfer force from the thoracic support mechanism 58 to the upper armature 50. In the embodiment shown, the couplers 104 are common to both the lumbar and thoracic support mechanisms 56, 58 such that the same couplers 104 interconnect both the lumbar and thoracic support mechanisms 56, 58 to the upper armature 50. However, those having ordinary skill the art will appreciate that a coupler 104 could connect the lumbar support mechanism 56 to the upper armature 50, and a separate coupler 104 could connect the lumbar support mechanism 56 to the upper armature 50 without departing from the scope of the invention. As will be described in greater detail below, the couplers 104 are operable to move toward the rearward side 48 of the seatback 12 in response to a predetermined force applied to the impact body 74 and/or the crossbar 96, and in so doing, the couplers 104 act on the upper armature 50 to move the head restraint 36 toward the occupant 24.

In the embodiment shown, the couplers 104 are each disposed adjacent and are generally parallel to respective side frame members 40. The couplers 104 each include an upper member 106 and a lower member 108, and each is flat and elongate. The lower member 108 is pivotally mounted to the side frame member 40 at pivot point 110 (FIG. 2). The upper member 106 is pivotally mounted to the lower member 108 at pivot point 112 (FIG. 2). The upper member 106 is pivotally mounted to the linkage 64 of the upper armature 50 at coupling point 114 as shown in FIG. 4. The pivoting movement of pivot points 110, 112 and coupling points 114 is achieved via fasteners, bearings, or other suitable means.

Each end of the crossbar 96 and each enlarged portion 102 of the thoracic support mechanism 58 are attached via welds or other suitable means to one of the upper members 106 of the respective coupler 104. Likewise, the end sections 90 of the linkage 80 of the lumbar support mechanism 56 are mounted within corresponding apertures 116 in the upper members 106 of the respective coupler 104 as shown in FIG. 3. As such, forces transfer from the lumbar and thoracic support mechanisms 56, 58 to actuate the couplers 104, thereby pivoting the upper armature 50 as will be described in greater detail below.

Figure 5:
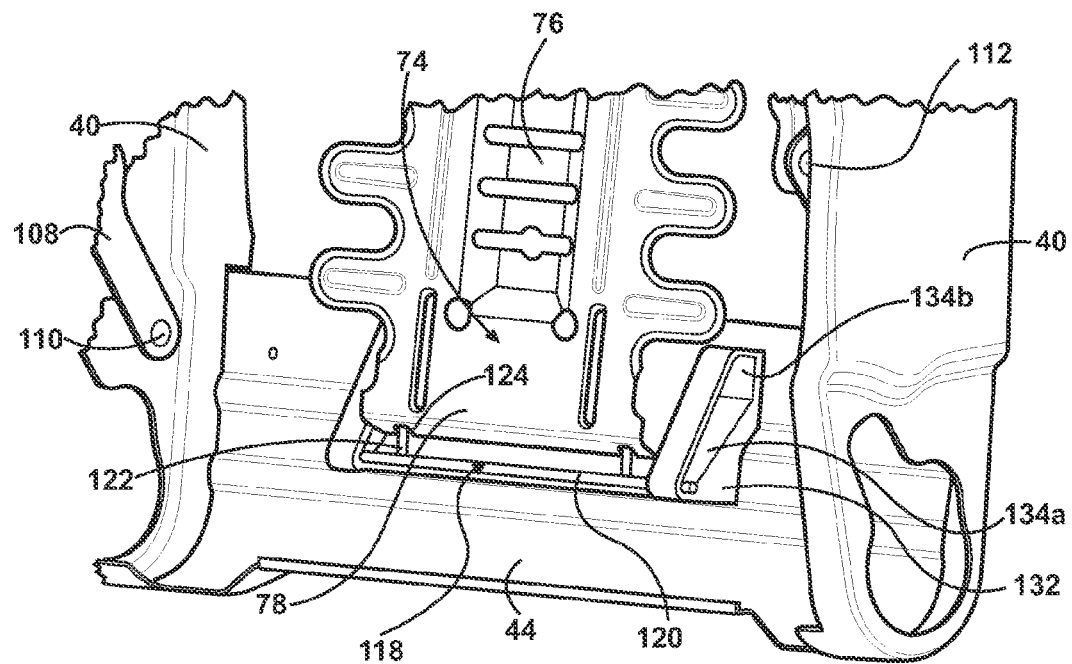
FIG. 5 is a side perspective view of the lower end of the vehicle seat assembly shown in FIG. 2.

As mentioned above, the lower armature 52 includes a pelvic support mechanism 54 for transferring force from the pelvic area 26 of the occupant 24 to the upper armature 50. In the embodiment shown, the pelvic support mechanism 54 includes at least one transfer rod, generally indicated at 118 in FIGS. 2 through 5. The transfer rod 118 includes a lower cross bar 120 and at least one, and preferably, a plurality of linking rods 122. The lower cross bar 120 is disposed horizontally and extends between the two side frame members 40, and the linking rods 122 are mounted to the cross bar 120 by welding or other suitable manner and extend vertically therefrom toward the upper armature 50. The linking rods 122 are spaced horizontally away from each other. As shown in FIG. 3, the mounting bracket 82 includes a plurality of mounting members 123, which extend from the middle section 84 of the mounting bracket 32 and wrap around one of the linking rods 122 for fixed attachment. The transfer rod 118 is also operatively mounted to the impact body 74. For instance, in the embodiment shown, the impact body 74 includes a plurality of apertures 124 through which the linking rods 122 of the transfer rod 118 extend. One set of apertures 124 is disposed on the lower end 78 of the impact body 74 as shown in FIG. 5, and another set of apertures 124 is disposed on the upper end 76 of the impact body 74 as shown in FIGS. 2 and 4. Each linking rod 122 extends through one aperture 124 of each set of apertures 124. The transfer rod 118 is also operatively mounted to the upper armature 50. More specifically, in the embodiment shown, the upper armature 50 includes a plurality of tabs 126. The tabs 126 are mounted to the crossbar 60 of the upper armature 50 and extend toward the forward side 46 of the vehicle seat assembly. The tabs 126 each include an aperture 128, and the linking rods 122 each extend through one of the apertures 128. In the embodiment shown, the tabs 126 include a bushing 129 such that the linking rods 122 can more easily move within the apertures 128. Also, each of the linking rods 122 includes a bend 130 included proximate and below the corresponding tab 126 as shown in FIG. 4. The bend 130 abuts against the corresponding tab 126 as the transfer rod 118 moves upward. As will be described, the transfer rod 118 is operable to move toward and act upon the upper armature 50 in response to a predetermined force applied to the impact body 74 to move the head restraint 36 toward the occupant 24.

The vehicle seat assembly 10 further includes at least one, and preferably, a plurality of ramps 132 as shown in FIG. 5. Each ramp 132 is mounted to the lower cross member 44 of the seatback frame 38, behind the lower end 78 of the impact body 74. Each ramp 132 also includes at least one cam surface 134 extending generally upward toward the upper armature 50. In the embodiment shown, each ramp 132 includes a first cam surface 134a that is in communication with a second cam surface 134b. The first cam surface 134a is disposed nearer the lower cross member 44 in comparison with the second cam surface 134b. The first cam surface 134a, extends from the forward side 46 and toward the rearward side 48 of the seatback 12 and from the lower cross member 44 toward the upper armature 50, and the second cam surface 88b extends upward toward the upper armature 50 and is generally parallel to the side frame members 40. Those having ordinary skill in the art will appreciate that the ramp 132 can include any number of cam surfaces oriented in any manner toward the upper armature 50 without departing from the scope of the invention. Both ends of the lower crossbar 120 of the transfer rod 118 are slidably supported within the ramp 132 on the cam surfaces 134a, 134b for guided upward and rearward movement thereon. As such, the lower crossbar 120 of the transfer rod 118 moves toward the upper armature 50 on said cam surfaces 134a, 134b in response to a predetermined force applied to the impact body 74. In the preferred embodiment shown in FIG. 5, the cam surfaces 134a, 134b are enclosed by the corresponding ramp 132 to retain the lower crossbar 120 within the ramps 132. The transfer rod 118 can include retainers (not shown), such as washers fixed to the lower crossbar 120, that abut against the ramps 132 to further retain the lower crossbar 120 therein.

In operation of the pelvic support mechanism 54, a rear end collision causes the occupant 24 to apply a force to the impact body 74, and the impact body 74 coincidentally moves toward the rearward side 48 of the seatback 12. This movement causes the impact body 74 to abut against the transfer rod 118, especially at the lower end 78 of the impact body 74 where the linking rods 122 are mounted to the impact body 74. This abutment moves the lower crossbar 120 of the transfer rod 118 within the ramps 132 on the cam surfaces 134a, 134b for guided upward movement of the transfer rod 118 toward the upper armature 50. More specifically, the lower crossbar 120 initially moves upward and rearward on the first cam surface 134a, and if the impact is sufficient, the lower crossbar 120 subsequently moves upward on the second cam surface 134b. This movement causes the bends 130 of the linking rods 122 to abut against the tabs 126 of the upper armature 50, thereby pivoting the upper armature 50 and ultimately moving the head restraint 36 toward the head and neck area 32 of the occupant 24. Those having ordinary skill in the art will appreciate that the ramps 132 and the impact body 74 could be disposed anywhere in the seatback 12 such that input forces from any area of the occupant 24, including the lumbar and thoracic areas 28, 30, could cause the lower armature 52 to move upward toward and act upon the upper armature 50 to thereby move the head restraint 36 to move toward the occupant 24.

Movement of the impact body 74 also actuates the lumbar support mechanism 56. More specifically, movement of the impact body 74 moves the mounting bracket 82 and the linkage 80 toward the rearward side 48 of the seat back 12 thereby pulling the couplers 104 toward the rearward side 48 of the seatback 12. The couplers 104 in turn pull the linkages 64 of the upper armature 50 and cause the upper armature 50 to pivot about the pivot points 65, thereby pivoting the upper armature 50 and ultimately moving the head restraint 36 toward the head and neck area 32 of the occupant 24.

Additionally, force from the occupant 24 actuates the thoracic support mechanism 58. More specifically, force from the occupant 24 applied to the crossbar 96 and enlarged portions 102 causes movement of the coupler 104 toward the rearward side 48 of the seatback 12 thereby pivoting the upper armature 50 and ultimately moving the head restraint 36 toward the head and neck area of the occupant 24.

The biasing members 68 return the upper support armature 50 to the upright position. The biasing members 68 also inhibit the upper armature 50 from unnecessarily moving when lower levels of force are applied from the occupant 24, such as when the occupant leans back in the vehicle seat assembly 10. Preferably, the stiffness of the biasing members 68 is adjusted such that only forces exceeding a predetermined level will cause the lower armature 52 to actuate the upper armature 50. The predetermined level of force is preferably selected based upon the forces involved in an average rear end collision.

Each of the pelvic, lumbar, and thoracic support mechanisms 54, 56, 58 act cooperatively to pivot the upper armature 50, thereby causing the head restraint 36 to move toward the head and neck area 32 of the occupant 24 for improved support of the head and neck area 32 of the occupant 24 during a rear end collision. Those having ordinary skill in the art will appreciate that the kinematics of the vehicle seat assembly 10 allows the pelvic, lumbar, and thoracic support mechanisms 54, 56, 58 to operate cooperatively. For instance, the coupling points 114 are disposed relative to the pivot points 65, specifically below and rearward of the pivot points 65, such that generally rearward movement of the couplers 104 cause rotation of the upper armature 50. Likewise, the tabs 126 of the upper armature 50 are disposed forward of the crossbar 60 and rearward of the pivot points 65 such that generally upward movement of the transfer rod 118 causes rotation of the upper armature 50. Also, those having ordinary skill in the art will appreciate that the vehicle seat assembly 10 could include only one or two of the pelvic, lumbar, and thoracic support mechanisms 54, 56, 58 without departing from the scope of the invention.

In summary, the vehicle seat assembly 10 of the present invention provides an active head restraint system 34 that is more responsive to forces that are imparted to the seatback 12 by the occupant 24. The vehicle seat assembly 10 more efficiently and more quickly transfers forces from the occupant 24 to the head restraint 36 for more effective actuation of the head restraint 36 toward the occupant 24, thereby better supporting the occupant 24 during a rear end collision. Finally, the vehicle seat assembly 10 of the present invention addresses these specific problems in a system that is relatively efficient, lightweight, robust, and cost effective.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

We claim:

1. A vehicle seat assembly comprising:
   a seatback frame; and
   an active head restraint system operatively supported by said seatback frame, said active head restraint system including an upper armature moveably mounted to said seatback frame, a head restraint mounted to said upper armature, and a lower armature operatively attached to said upper armature, said lower armature including an impact body and at least one transfer rod operatively mounted to said impact body and to said upper armature, and at least one ramp with at least one cam surface extending generally toward said upper armature, said transfer rod supported on said cam surface such that said transfer rod moves on said cam surface toward said upper armature, and said lower armature operable to move toward said upper armature in response to a predetermined force applied to said impact body and act on said upper armature to move said head restraint toward the occupant.

2. A vehicle seat assembly as set forth in claim 1 further including a rearward side, wherein said lower armature is also operable to move toward said rearward wide in response to a predetermined force applied to said lower armature and act on said upper armature to move said head restraint toward the occupant.

3. A vehicle seat assembly as set forth in claim 2, wherein said lower armature further includes:
   an impact body;

at least one coupler operatively mounted to said upper armature; and
a linkage operatively mounted to said impact body and said coupler, wherein said coupler is operable to move toward said rearward side in response to a predetermined force applied to said impact body.

4. A vehicle seat assembly as set forth in claim 2, wherein said lower armature further includes:
at least one coupler operatively mounted to said upper armature; and
a crossbar operatively mounted to said coupler such that a predetermined force that is applied to said crossbar causes movement of said coupler toward said rearward side thereby moving said head restraint toward the occupant.

5. A vehicle seat assembly as set forth in claim 1, wherein said upper armature is pivotally mounted to said seatback frame.

6. A vehicle seat assembly as set forth in claim 1, wherein said lower armature includes at least one coupler having an upper member pivotally mounted to said upper armature and a lower member pivotally mounted to said seatback frame, said upper member pivotally mounted to said lower member.

7. A vehicle seat assembly as set forth in claim 1, wherein said lower armature includes at least one coupler, and wherein said upper armature includes a crossbar and at least one linkage, said linkage rigidly mounted to said crossbar, pivotally mounted to said coupler, and pivotally mounted to said seatback frame.

8. A vehicle seat assembly as set forth in claim 7, further including at least one biasing member operatively mounted to said linkage and said seatback frame, said biasing member operative to bias said head restraint toward an upright position.

9. A vehicle seat assembly for receiving an occupant, the seat assembly comprising:
a seatback frame;
an upper armature that is movable relative to the seatback frame;
a head restraint mounted on the upper armature;
an impact body that is movable relative to the seatback frame, the impact body including an upper end; and
a linkage assembly operatively interconnecting the upper armature and the impact body such that movement of the impact body relative to the seatback frame acts on the linkage assembly to move the upper armature relative to the seatback frame to cause the head restraint to move toward the occupant, the linkage assembly including a linkage and a coupler movably connected to the linkage, the coupler including a first member movably connected to the seatback frame at a first location below the upper end of the impact body while the coupler is operatively connected to the impact body at a second location spaced from the first location, and a second member movably connected to the first member at a location below the upper end of the impact body.

10. The seat assembly of claim 9 wherein the upper armature is operatively connected to one of the linkage and the coupler, and the impact body is operatively connected to the other of the linkage and the coupler.

11. The seat assembly of claim 9 further comprising an additional linkage assembly operatively interconnecting the upper armature and the impact body, the additional linkage assembly including an additional linkage and an additional coupler movably connected to the linkage, the additional coupler including an additional first member movably connected to the seatback frame, and an additional second member movably connected to the additional first member at a location below the upper end of the impact body, wherein the linkage assembly is disposed proximate a first side of the seatback frame, and the additional linkage is disposed proximate a second side of the seatback frame.

12. The seat assembly of claim 11 wherein the first member of the coupler and the additional first member of the additional coupler are each pivotally connected to the seatback frame.

13. The seat assembly of claim 12 wherein the second member of the coupler is pivotally connected to the first member and the additional second member of the additional coupler is pivotally connected to the additional first member.

14. The seat assembly of claim 11 further comprising a lateral member disposed behind the impact body and operatively connected to at least one of the linkage and the coupler.

15. The vehicle seat assembly of claim 9 wherein the second location is spaced vertically away from the first location.

16. The vehicle seat assembly of claim 15 further comprising a biasing member associated with the upper armature for biasing the head restraint away from the occupant.

17. A vehicle seat assembly for receiving an occupant, the seat assembly comprising:
a seatback frame;
an active head restraint system operatively supported by said seatback frame, said active head restraint system including an upper armature movably mounted to said seatback frame, a head restraint mounted to said upper armature and a lower armature that is movable relative to said seatback frame and said upper armature, said lower armature including an impact body having an upper end; and
a coupler extending between said lower armature and said upper armature and operatively interconnecting said upper armature and said lower armature such that movement of said impact body relative to said seatback frame acts on said coupler to move said upper armature relative to said seatback frame so as to move said head restraint toward the occupant, said coupler including a first connection location movably connected to said seatback frame below said upper end of said impact body, and said coupler including a second connection location operatively connected to said impact body, wherein said second connection location is spaced away from said first connection location.

18. A vehicle seat assembly as set forth in claim 17 further comprising a linkage connected to said upper armature and pivotally connected to said seatback frame to facilitate movement of said upper armature to move said headrest toward the occupant in response to movement by said coupler.

19. A vehicle seat assembly as set forth in claim 18 wherein said coupler includes first and second ends with said first end being pivotally connected to said linkage and said second end including said first connection location, said first connection location being pivotally connected to said seatback frame.

20. A vehicle seat assembly as set forth in claim 19 wherein said coupler comprises a first member and a second member pivotally connected to said first member, said first member including said first end, and said second member including said second end.

21. A vehicle seat assembly as set forth in claim 17 further comprising a linkage which operatively interconnects said lower armature to said coupler such that movement of said lower armature relative to said seatback acts on said linkage and said coupler to pivot said upper armature relative to said seatback.

22. A vehicle seat assembly as set forth in claim 17 further comprising an additional coupler operatively interconnecting said upper armature and said lower armature, wherein said coupler is positioned proximate a right side of said seatback frame, and said additional coupler is positioned proximate a left side of said seatback frame.

23. A vehicle seat assembly as set forth in claim 22 further comprising first and second linkages connected to the upper armature, the first linkage being connected to the coupler and pivotally connected to the seatback frame, and the second linkage being connected to the additional coupler and pivotally connected to the seatback frame.

24. A vehicle seat assembly as set forth in claim 17 further comprising a biasing member associated with the active head restraint system for biasing the head restraint away from the occupant.

25. A vehicle seat assembly for receiving an occupant, the seat assembly comprising:
   a seatback frame;
   an upper armature that is movable relative to the seatback frame;
   a head restraint mounted on the upper armature;
   an impact body that is movable relative to the seatback frame, the impact body having an upper end; and
   a linkage assembly operatively associated with the upper armature and the impact body such that movement of the impact body relative to the seatback frame acts on the linkage assembly to move the upper armature relative to the seatback frame to thereby cause the head restraint to move upward and forward toward the occupant, the linkage assembly including a linkage movably connected to the seatback frame, a first coupler member movably connected to the linkage, and a second coupler member movably connected to the first coupler member and movably connected to the seatback frame at a first location below the upper end of the impact body, wherein the impact body is operatively connected to one of the first coupler member and the second coupler member at a second location spaced vertically away from the first location.

26. The seat assembly of claim 25 wherein the linkage and the second coupler member are each pivotally connected to the seatback frame, the first coupler member comprises an upper coupler member, and the second coupler member comprises a lower coupler member.

* * * * *

US008162392C1

(12) INTER PARTES REEXAMINATION CERTIFICATE (564th)
United States Patent
Humer et al.

(10) Number: US 8,162,392 C1
(45) Certificate Issued: Mar. 26, 2013

(54) VEHICLE SEAT HAVING ACTIVE HEAD RESTRAINT SYSTEM

(75) Inventors: Mladen Humer, Eastpointe, MI (US); Nagarjun Yetukuri, Rochester Hills, MI (US); Gerald Locke, Lake Orion, MI (US); Dale Smallwood, Clarkston, MI (US)

(73) Assignee: JPMorgan Chase Bank, N.A., Houston, TX (US)

Reexamination Request:
No. 95/002,341, Sep. 14, 2012

Reexamination Certificate for:
Patent No.: 8,162,392
Issued: Apr. 24, 2012
Appl. No.: 12/257,542
Filed: Oct. 24, 2008

Related U.S. Application Data

(63) Continuation of application No. 10/950,713, filed on Sep. 27, 2004, now Pat. No. 7,644,987.

(51) Int. Cl.
*B60N 2/42* (2006.01)
(52) U.S. Cl.
USPC .................................. 297/216.12; 297/216.13

(58) Field of Classification Search ........................ None
See application file for complete search history.

(56) References Cited

To view the complete listing of prior art documents cited during the proceeding for Reexamination Control Number 95/002,341, please refer to the USPTO's public Patent Application Information Retrieval (PAIR) system under the Display References tab.

*Primary Examiner* — Peter C. English

(57) ABSTRACT

A vehicle seat assembly having a seatback frame, an upper armature that is movable relative to the seatback frame and a head restraint mounted on the upper armature. A linkage assembly operatively interconnects the upper armature and an impact body such that movement of the impact body relative to the seatback frame acts on the linkage assembly to move the upper armature relative to the seatback frame to cause the head restraint to move toward the occupant. The linkage assembly includes a linkage and a coupler movably connected to the linkage. The coupler includes a first member movably connected to the seatback frame and a second member movably connected to the first member at a location below the upper end of the impact body.

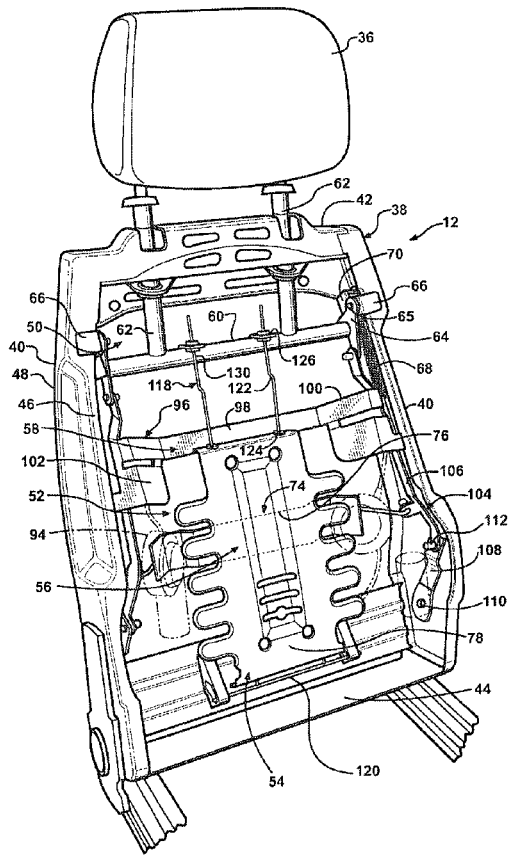

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 9-26 are cancelled.

Claims 1-8 were not reexamined.

\* \* \* \* \*